United States Patent Office 3,120,619
Patented Feb. 4, 1964

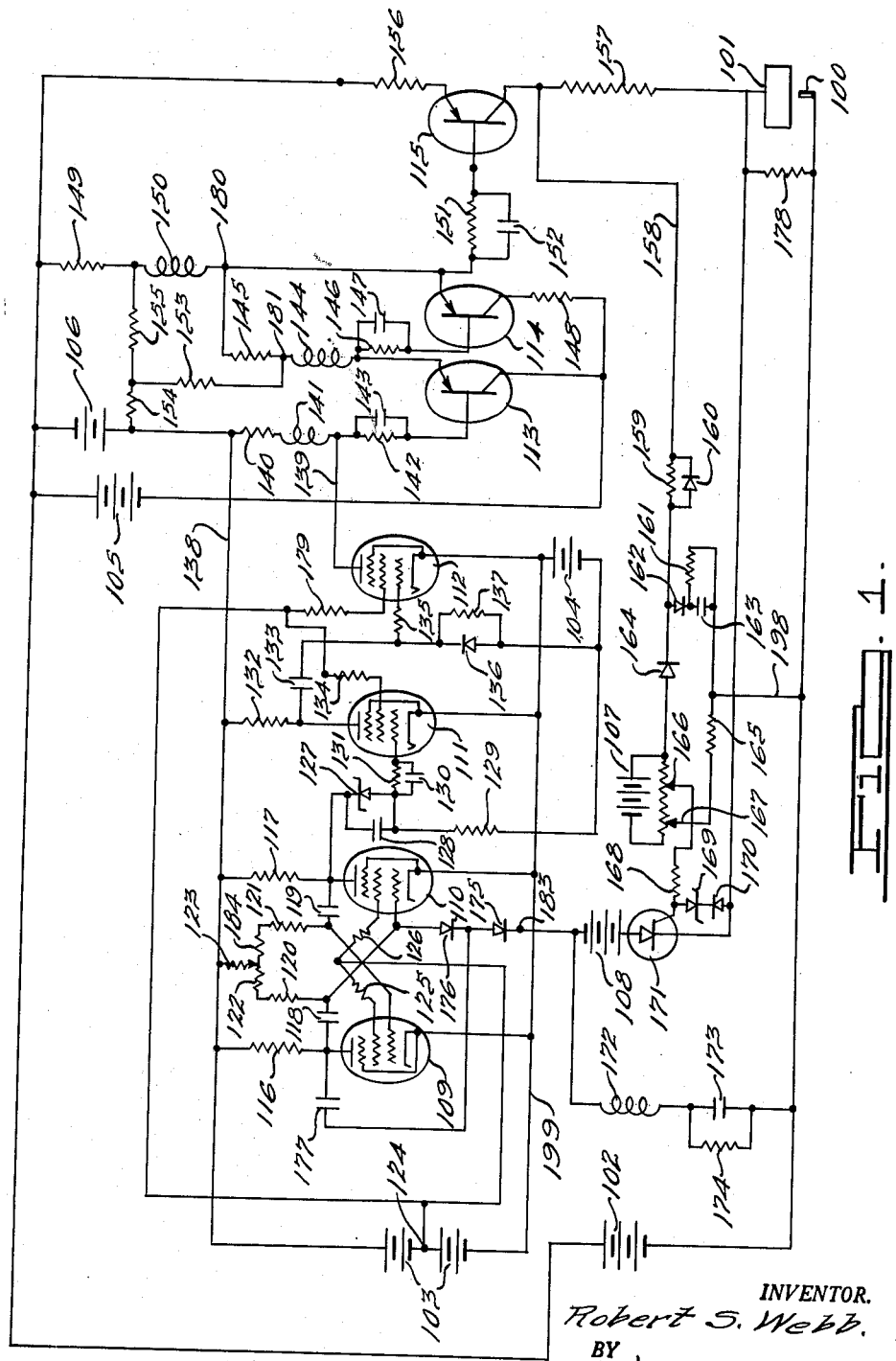

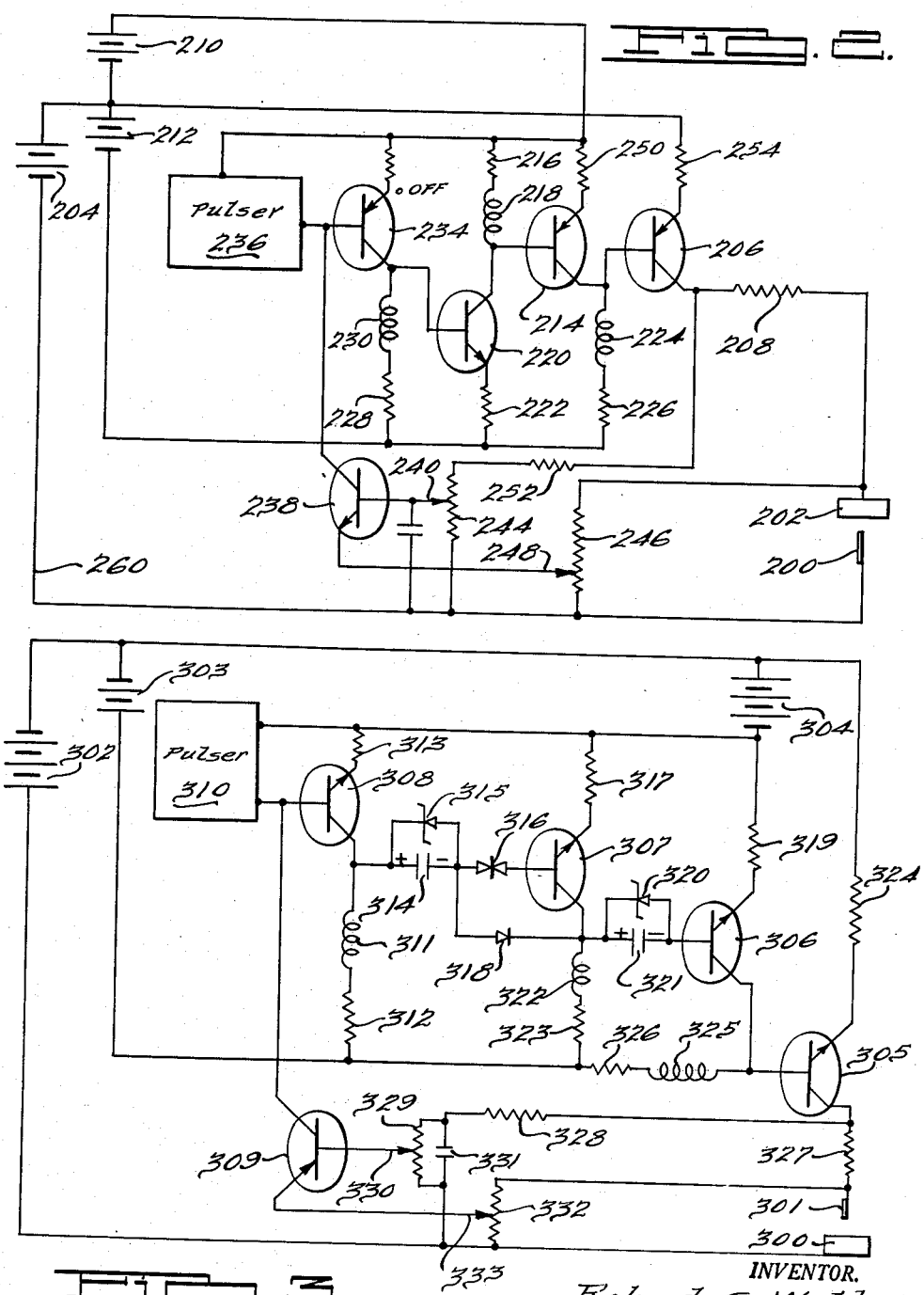

3,120,619
TRANSISTORIZED ELECTRIC DISCHARGE
MACHINING CIRCUIT
Robert S. Webb, Bloomfield Hills, Mich., assignor to Elox Corporation of Michigan, Troy, Mich., a corporation of Michigan
Filed Apr. 13, 1961, Ser. No. 102,678
20 Claims. (Cl. 307—88.5)

This invention relates to electrical discharge machining particularly to improved machining power circuits therefor.

Electrical discharge machining, sometimes referred to in the art as EDM, spark machining, or arc machining, is carried on by passing a series of discrete, localized, extremely high current density, discharges across a gap between a conductive tool electrode and a conductive workpiece at sonic or ultrasonic frequencies in the presence of a dielectric fluid for eroding the workpiece.

In electrical discharge machining, the conductive tool is usually maintained in proximate position with respect to the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

Numerous improvements in the art of electrical discharge machining have caused it to advance from the stage of a laboratory curiosity to a highly productive machine tool widely used today in the toolroom and production line. Advanced electrical discharge machining power circuitry utilizes electronic switches such as vacuum tubes for minutely and accurately controlling the discrete discharges across the gap. An example of the type of machining power circuit responsible for this advance is shown in Matulaitis and Lobur Patent No. 2,951,969, issued September 6, 1960. A machining power circuit such as disclosed therein when combined with a power feed of an improved type, as shown in my Patent No. 2,962,630, issued November 29, 1960, results in a machine having excellent control characteristics and readily usable by machinists having mechanical skill only and no electrical or electronics background, as is typical of the machining trades. The principal limitation of the machining power circuit shown in Patent No. 2,951,969, is that vacuum tubes are employed and these devices are inherently low current, high voltage devices. Electrical discharge machining as now carried on, on the other hand, is an extremely high current, low voltage operation in which the discharge voltage after ionization of the gap is approximately 15 volts regardless of machining current amplitude, the latter frequently being in the order of hundreds, sometimes thousands of amperes.

A machining power circuit capable of such extremely high current output requires many, sometimes thousands of vacuum tubes to produce the desired machining current. Since vacuum tubes are inherently high voltage devices, extremely high power losses occur at these machining currents, and expensive equipment and complex electronic circuitry is required. The cost of operation of such a unit is correspondingly high. Furthermore, vacuum tubes are thermionic emissive type devices and their average or rated life is approximately one thousand hours. With this limited life, it can be seen that as the number of vacuum tubes increases, not only does the cost of equipment increase, but the cost of operation and maintenance required and the service problems brought about by tube failure are increased many fold.

Specialized forms of circuitry have been proposed to improve the efficiency of vacuum tube circuitry by matching the low current, high voltage, characteristics of a vacuum tube with the high current, low voltage, requirements of the machining gap through an impedance matching transformer. This type of machining power circuit requires far fewer vacuum tubes, but has some limitations since pulse transformers must be incorporated. Such pulse transformers have inherent relatively high inductance, thus requiring higher voltages of operation and suffer the additional limitation of poor frequency characteristics.

A satisfactory electrical discharge machining power circuit now requires a wide range of adjustment in On-Off ratio or duty factor of the machining power pulse. In addition, widely varying machine frequencies of operation are required in today's commercial product and this is not practical in a pulse transformer type of power circuit.

Accordingly, it is the principal object of this invention to provide an improved machining power circuit utilizing transistors as the electronic switching element. Transistors are solid state electronic switching devices generally of low voltage, high current, rating and are therefore ideally suited to a machining power circuit. In addition, no practical limit has been found on the operating life of individual transistors in a properly designed circuit. In one example of a present day machining power circuit employing transistors, a bank of 30 power transistors are used to produce an output of 300 amperes average machining current. A circuit of such current constructed from vacuum tubes directly connected would require more than 1000 vacuum tubes. Because there is a large general industry demand for single transistors having extremely high current switching characteristics capable of carrying 100 amperes and more per single device, transistors of the above described type are readily obtainable; whereas vacuum tubes of current carrying capacity even approaching those values are unobtainable. It can therefore be seen that not only is circuit complexity greatly reduced, eliminating the possibility of individual component failures, but short life vacuum tubes are replaced with long life transistors.

Another object of this invention is to provide improved pulse switching circuitry for power transistors having extremely sharp turn-on and turn-off characteristics.

Another object of this invention is to provide a novel circuit for coupling a vacuum tube multivibrator amplifier to a transistor amplifier and a machining power circuit.

Still another object of this invention is to provide an improved machining power circuit employing high speed transistors, pulser controlled, with extremely fast switching speeds presently required in high speed machining.

Other objects and advantages are disclosed in the following specification, which taken in conjunction with the accompanying drawings, discloses preferred forms of practicing the invention.

In the drawings in which reference numerals have been used to designate like parts herein referred to:

FIG. 1 shows a machining power circuit employing a vacuum tube multivibrator and pulser pre-amplifier coupled to a transistor amplifier for driving an output bank of transistors with extremely sharp pulse drive;

FIG. 2 shows a simplified form of transistor amplifier employing alternate stages of PNP and NPN transistors in a simplified form of drive circuitry including a transistorized short circuit protection device;

FIG. 3 is an improved type of NPN transistor circuit having extremely high speed switching characteristics especially designed for improved electrical discharge machining power and turn-off characteristics.

Referring now to FIG. 1, a machining power supply 102 is connected such that it may be electronically switched by a power transistor 115, for controlling the pulse duration and frequency of discharge across the gap between the workpiece 101 and electrode 100. Power transistor 115 represents a bank of transistors, sometimes hundreds in number, depending on the machining power required.

In the above drawings, the D.C. supplies are shown as batteries in the interest of simplifying the disclosure. In actual practice, these sources of D.C. are derived from the secondary of a transformer having its primary connected to the power source for the machine which may be single phase or polyphase A.C. The secondary voltage is rectified and stored, usually in an electrolytic storage capacitor to form a nearly ideal D.C. source having very low internal impedance.

PNP transistors 113 and 114 are pre-amplifiers for driving the base of transistor 115 with the extremely high drive current required for a large bank of transistors. The rectangular pulse signal derived from multivibrator tubes 109 and 110 is pre-amplified in pentodes 111 and 112 to present suitable drive of rectangular wave form to the pre-amplifier transistors. The pentodes 111 and 112 represent banks of tubes of the number required to provide the necessary power.

Power for the vacuum tube pulser and pre-amplifier is derived from plate supply 103 and bias 104. Drive power for the transistor pre-amplifier is obtained from transistor drive power supply 105. Transistor bias supply 106 is provided for biasing the transistors during periods of nonconduction just as bias 104 is provided for the vacuum tube pre-amplifier.

Multivibrator pentodes 109 and 110 have output signal resistors 116 and 117 connecting the anodes of the multivibrator tubes to the positive terminal of the plate supply voltage 103. The control grids of tubes 109 and 110 are cross-connected respectively through coupling capacitors 119 and 118 to the anodes of the opposing tube and grid current limiting resistors 121 and 120 are connected as shown to potentiometer 122—184 which in combination with these two resistors and the coupling capacitors 118 and 119 forms the time constant for operation of the multivibrator. The adjustable tap of potentiometer 122—184 is connected through balancing resistor 123 to the positive terminal of voltage supply 103.

This novel grid return of the multivibrator is extremely important in a modern electrical discharge machining power circuit because of the wide range of On-Off ratio required at a particular frequency. It is desirable to have the machine maintain the selected constant frequency and have a widely adjustable On-Off ratio at that particularly frequency. This is achieved through the novel grid return potentiometer 122—184.

It is well known in multivibrator design that the operating period of a multivibrator may be represented by the formula:

$$t = K[C119(R121+R184) + C118(R120+R122)]$$

If coupling capacitors 118 and 119 are equal, the formula may be simplified to:

$$t = K_1(R121+R120+R122+R184)$$

From this simplified formula, it can be seen that as the tap on potentiometer 122—184 is moved from one extreme to the other, resistance is similarly moved from one grid return to the opposing grid return, thereby maintaining a constant frequency regardless of the position of the potentiometer tap.

The screen grid of pentode 109 is connected through resistor 125 to tap 124 on plate supply 103. Similarly, resistor 126 connects the screen of tube 110 to that same supply just as resistors 134 and 179 return the screens of tubes 111 and 112 respectively to the screen grid tap of the plate supply.

Another important characteristic of this circuit is shown in the means of coupling the output signal of the multivibrator to the control grid of amplifier 111. As mentioned above, wide ratios of adjustment of On-Off ratio are required in a present day machine, particularly with regard to the minimum On-time or output pulse duration of transistor bank 115. Analysis of this circuit will show that multivibrator tube 110 and power transistor 115 are On or rendered conductive in phase. For extremely short or narrow On-times, insufficient power is transferred through a coupling capacitor and therefore an improved circuit is required to properly couple the output of the multivibrator to amplifier tube 111.

This improved coupling circuit is achieved through use of a reference diode 127 and a shunt capacitor 128 for referencing the rectangular or pulse output developed across signal resistor 117 downward as is required for proper control of the grid of amplifier 111. A bias return resistor 129 is provided to maintain tube 111 biased Off during nonconducting portions of its cycle.

As multivibrator tube 110 becomes conductive, a voltage drop occurs across signal resistor 117. A typical value for plate supply voltage 103 is approximately 250 volts and the drop across multivibrator tube 110 during conduction is approximately 100 volts, therefore generating a signal of approximately 150 volts across resistor 117.

As long as the regulated voltage of reference diode 127 is larger than the drop across tube 110, the control grid of tube 111 will at this time, be negative. In the example given, this reference diode would be approximately 200 volts and the control grid of tube 111 therefore would be biased to approximately minus 100 volts. Reference diode 127 and capacitor 128 form a network for a floating voltage supply having almost no capacitive losses during switching as would be encountered if a D.C. supply were developed and employed at this point, thus high frequency passing characteristics required for sharp rise and fall of drive signal are preserved.

As multivibrator tube 110 becomes nonconductive, the voltage signal across resistor 117 disappears, thereby carrying the reference diode circuit positive. In this example, with a 250 volt plate supply and a 200 volt reference diode, approximately 50 volts is developed across resistor 131 connected in the control grid of tube 111 since the control grid clips the signal at approximately the same voltage as the cathode of tube 111. An extremely small lead capacitor 130 is connected across resistor 131 for improving the sharp rise and fall characteristics of this signal thereby causing amplifier 111 to both amplify and re-square the signal.

Amplifier 111 develops a signal across resistor 132 which is coupled through capacitor 133 and clamping diode 136 to the grid circuit of amplifier 112. Bias return resistor 137 and grid current limiting resistor 135 are provided as shown in a manner widely applied in pulser amplifier circuitry.

Generally the Off-time or duration between pulses of the output transistor bank is at least 20% of the total signal. For such a conduction time of tube 111, sufficient power is transferred through coupling capacitor 133 and a normal coupling circuit may be employed in the grid circuit of amplifier 112. On-time may vary from approximately 80% of total signal to less than 1%, Off-time changing accordingly.

In coupling the output of the last stage of vacuum tube amplification to the transistor pre-amplifier, the same problem prevails as in coupling the output of the multivibrator to the first stage of amplification. During narrow portions of conduction of the output transistor bank, amplifier tube 112 is also rendered conductive for a narrow portion of each cycle. An additional complication is that transistors which are inherently low voltage, high current devices, when connected in common emitter relationship as shown, require large amounts of drive current compared to a vacuum tube device which is essentially a voltage switch except in the regions of grid current. For this reason, the vacuum tube amplifier is interconnected as shown with the transistor pre-amplifier, the positive terminal of plate supply 103 being connected to the positive terminal of bias supply 106 of the transistorized amplifier by lead 138.

Lead 139 is connected to the anode of amplifier 112 and in conjunction with lead 138 represents the signal output of the vacuum tube pre-amplifier.

At the instant of turn-on of amplifier tube 112, which usually is composed of a bank of vacuum tubes, electron flow is from the negative terminal of supply 103 to the cathode of amplifier 112 through lead 199. From the anode of amplifier 112, this electron flow occurs instantaneously through line 139 and is retarded by the inductance of choke 141. A lead capacitor 143 permits this electron flow to enter the base of first transistor amplifier 113. At this first instant, all transistors are nonconductive and this signal is additionally led from the emitter of transistor 113 through lead capacitor 147, the base-emitter of transistor 114, lead capacitor 152, base-emitter of transistor 115, balancing resistor 156 to the negative terminal of bias 106 and is returned from the positive terminal of bias 106 to the positive terminal of the plate supply voltage of 103 through lead 138.

This principle represents the fundamental improvement of this form of circuitry in that from the first instant of drive, signal is led through each stage of the amplifier tending to render all of the transistors of the amplifier in addition to the output transistor bank conductive at the same instant. After the minute delay time required of transistor 113, it becomes conductive and amplifies the signal and causes additional electron flow from the negative terminal of drive supply 105 through the collector-emitter of transistor 113, and additionally through the lead network 147, 114, 152, 115. Similarly, as transistor 114 is rendered conductive, additional amplified signal flows from the negative terminal of supply 105 through limiting resistor 148, the collector-emitter junction of transistor 114 and additionally through the lead network 152—115. During this period of turn-on, almost no shunt current flows in the corresponding bias circuits being blocked from each bias circuit by chokes 141, 144, 150 respectively. Furthermore, additional acceleration is provided by lead capacitors 143, 147, 152, thereby forcing all transistors sharply into conduction.

As lead capacitors 143, 147, 152, become charged and as conduction occurs through chokes 141, 144, 150, the circuit achieves steady-state conduction. Resistors 140 and 142 are chosen with the voltage considerations in mind such that an approximately equal shunt current flow occurs through choke 141 and resistor 140 after the minute delay interval of choke 141. Similarly, resistors 145 and 146 are chosen in accordance with this principle to provide equal drive current and shunt bias current during steady-state conditions as are resistors 151 and 149 respectively in the base circuit of transistor 115.

With the proper choice of these balancing resistors and consideration of the voltage dividers involved from bias supply 106, equal drive current and shunt current occurs in the base circuit of each transistor. As tube 112 is rendered sharply nonconductive, choke 141 continues electron flow from choke 141, resistor 140, resistor 154, resistor 153, choke 144, emitter-base of transistor 113, and lead capacitor 143. Choke 141 sustains at the instant of turn-off a current equal to that flowing through it previously which by design is equal to the forward or drive current. The induced voltage of this choke in addition to the voltage stored across lead capacitor 143 presents a sharp turn-off signal through transistor 113, thereby rendering it sharply nonconductive.

In a similar manner, choke 144 forces electron flow through resistor 145, emitter-base of transistor 114 and lead capacitor 147 thereby sharply biasing transistor 114 nonconductive.

Choke 150 similarly forces electron flow through resistor 149, balancing resistor 156, emitter-base of transistor 115, lead capacitor 152, thereby rendering the output transistor bank sharply nonconductive.

An analysis of this circuitry will show that these cascaded chokes "kick" properly in phase to sharply turn-off their respective transistors and output signal is divided from these chokes by the divider resistor networks as shown. Thus, a shunt path for electron flow for choke 150, for example, is also through resistors 155, 153, 145, which would tend to cause transistor 114 to remain conductive. Because the base circuit of transistor 114 is returned at point 180, the reflected magnitude of this "kick" is sharply reduced being equal only to the voltage developed across resistor 145. This voltage resulting from "kick" of choke 150 is overcome by the "kick" of choke 144 in the base circuit of transistor 114. A similar divider occurs in returning the base circuit of transistor 113 to the anode of tube 112 through lead 139. Thus, a portion of the choke voltage induced in each case is fed back to the preceding stage and is overcome by the choke of that preceding stage. Choke 141 and resistor 140 which are of high impedance, characteristic of the vacuum tube circuitry, must conduct to overcome the "kicks" of all subsequent chokes. Therefore, the induced voltage of choke 141 must exceed the total of chokes 150, 144 in order to sharply bias transistor 113 nonconductive by addition to the bias stored across capacitor 143 during conduction drive.

This unique circuit employing shunt choke drive and the cascaded returns as shown at 180, 181, 182 forms an extremely sharp pulse drive during turn-on of the transistor causing lead of drive current through the transistor network and during turn-off, sustaining a sharp high bias current for the duration of storage time and turn-off time of each stage of the transistor amplifier. By proper choice and balancing of these chokes, extremely sharp turn-off characteristics can be achieved for each stage of the transistor amplifier and of the entire amplifier as a unit. The degree of interconnection and cascading of this circuit is complex and requires special consideration in the calculation of each choke value and resistance value accordingly.

During periods of static nonconduction in which turn-off has been achieved and no current is flowing in the respective base circuits, bias is achieved on each stage of the transistor amplifier through the novel divider shown as resistors 149, 155, 154. Resistors 149, 155 and 154 are of successively higher resistance values, thereby producing a low voltage D.C. bias on the base of output transistor bank 115 and somewhat higher bias voltages on the bases of transistors 114 and 113 respectively. An additional resistor is shown connecting point 181 with the tap between resistors 154 and 155 to provide bias to transistor 114. By proper selection of resistors 154 and 155, in accordance with the division of signal as previously outlined, this resistor may be eliminated, however, additional voltage is developed across resistor 145 from the induced voltage of choke 180 during turn-off unless resistor 155 is properly selected.

Normally, the magnitude of machining power voltage 102 is very near the peak voltage rating of transistor bank 115, which is rated for voltage from collector to base as well as collector to emitter. By supplying an extremely low bias voltage of low impedance for the base of transistor 115, full advantage may be taken of the voltage ratings of this output transistor switch. Because of the extremely high drive currents required, excess power loss would occur in resistors 148 and 151 except that drive supply 105 is of much lower voltage magnitude than machining power voltage 102. For this reason, higher bias voltages may be employed on transistors 114 and 113 without limitations in output switching.

During a condition of choke induced voltage, the total voltage from emitter to collector of transistor 114 is that of supply 105, resistor 149, and choke 150 which at that instant is positive at terminal 180, therefore producing a somewhat higher switching voltage during the period of induced voltage of each of these chokes, than the D.C. voltage of supply 105. Similarly, the voltage across choke 144 is added to that of 150 in the emitter-collector circuit of transistor 113 thereby producing an even higher switching voltage for this transistor. As mentioned earlier, the total voltage of choke 141 must exceed the sum of the others, however, this is well within the rating of the peak anode voltage of vacuum tube 112 since it is a high voltage device having a rating of several thousand volts rather than the maximum of 100 to 200 volts typical for power transistors of this type. During pulse operation in which the output transistor bank is rendered sharply conductive and sharply nonconductive, this improved circuitry therefore provides extremely accelerated drive having sharp turn-on and turn-off characteristics vastly improving the normal switching times of the particular transistors without additional loss of switching power.

This circuit also includes a short circuit sensing network for sensing abnormally low voltage conditions across the machining gap and is called for convenience, "a per pulse cut-off circuit." As the output transistor bank 115 is rendered sharply conductive, keying lead 158 connects to this cut-off circuitry and at this time "keys" it into operation. During periods of conduction, line 158 is connected to the positive terminal of supply 102, less the minute losses in the collector-emitter circuit of transistor 115 and balancing resistor 156. This positive signal at line 158 draws electron flow through delay capacitor 163, diode 162, and delay resistance 159. After the delay interval determined by the product of capacitor 163 and resistor 159, a portion of this positive or keying signal is presented to the gate circuit of a silicon controlled rectifier 171. At this instant, the cathode of diode 164 is carried positive and therefore blocks electron flow. Connected to the negative end of delay capacitor 163 is resistor 165 and a sensing lead 198 returns this network to the negative terminal of supply 102 and also to electrode 100. Since diode 164 is blocked at this instant, a keying voltage determined by the difference between taps 167 and 166 from keying voltage supply 107, carries the gate positive with respect to the electrode by the difference in the voltage between 167 and 166.

If, at this instant, the electrode and workpiece are open circuited or if the machining voltage is above this pre-set amount, the cathode of controlled rectifier 171 will be more positive than the gate, thereby maintaining the controlled rectifier nonconductive. If a short circuit occurs or if the gap voltage between electrode 100 and workpiece 101 is below this predetermined amount, the gate is keyed positive with respect to the cathode and instantaneously triggers conduction of controlled rectifier 171. This condition corresponds to short circuit or an undesirably low machining voltage across the gap and the gap supply power should be so interrupted.

Conduction of controlled rectifier 171 through cut-off voltage supply 108 carries point 183 sharply negative since the cathode, at this instant, is approximately at the same voltage as electrode 100. Supply 108 is larger in voltage than the algebraic sum of voltage 102, 106 and 103, thereby carrying point 183 more negative in voltage than the cathode of multivibrator tube 110. As explained earlier, multivibrator tube 110 was conductive during the period of gap conduction caused by switching On of transistor 115. Carrying point 183 negative with respect to the cathode, causes conduction through diodes 175 and 176 triggering multivibrator tube 110 nonconductive. As this tube is rendered even partially nonconductive, the signal becomes regenerative and is amplified by the normal multivibrator action of tubes 109 and 110 thus rendering tube 110 sharply nonconductive and interrupting conduction of machining power bank 115 which of course interrupts the flow of power through the machining gap.

Since a negative voltage is required at the anode of controlled rectifier 171 to interrupt the conduction of that device, it is achieved through choke 172 and capacitor 173. During this period of conduction, capacitor 173 is charged to the voltage of supply 108 through choke 172. Electron flow, in this instance, is through controlled rectifier 171, supply 108, choke 172, capacitor 173, electrode 100, workpiece 101 to the cathode of controlled rectifier 171. This causes a voltage drop across choke 172 inducing a flux field in this choke. As capacitor 173 becomes charged equal to supply 108, the field of choke 172 collapses to sustain conduction thereby overcharging capacitor 173. This capacitor is overcharged to a voltage approximately twice that of supply 108. After collapse of the field of choke 172, this negative voltage stored across capacitor 173 is applied back through choke 172 thereby presenting a negative voltage at the anode of controlled rectifier 171 causing it to cease conduction. Additional electron flow occurs from this capacitor into diode 176 and multivibrator coupling capacitor 118. A shunt electron flow occurs through diode 175 into capacitor 177 which is of larger capacity than coupling capacitor 118. This larger capacity maintains the grid of tube 110 negative for a longer duration than normal and therefore permits complete recovery of the machining gap. Generally, this capacitor is two to three times the capacity of 118 thereby increasing the Off-time by this relative amount. After discharge of capacitors 177 and 118, the multivibrator triggers into conduction in the normal manner and diodes 175 and 176 again block. The time constant of resistor 174, capacitor 173 is of sufficient length to cause recovery of the blocking characteristic of controlled rectifier 171.

In a typical electrical discharge machine, a wide variety of frequencies are used and this is achieved through different values of coupling capacitors such as 118, 119 or through changes in resistors 120, 121, 122, 184, this is achieved through switching means and is straightforward and is not shown in the interest of simplicity. In each case, however, where coupling capacitor 118 is switched, Off-time control capacitor 177 must also be switched to maintain this same approximate time relationship between a failure pulse and a normal conduction pulse. Capacitor 173 and choke 172 conduct relatively higher current than either capacitor 118 or capacitor 177, such that changes in these values of capacitance do not materially affect this turn-off circuit.

During normal periods of Off-time in which controlled rectifier 171 has not fired, bias is maintained on the gate of that rectifier by electron flow through tap 167, resistor 165, resistor 178, resistor 157, keying lead 158, diode 160, diode 164, to the positive terminal of bias supply 107. At this time, the cathode of controlled rectifier 171 is returned to resistor 178 and through application of this divider network, the gate is maintained negative at these times. If this negative bias exceeds the rating of the particular device, resistor 168, reference diode 169, diode 170 are provided to clip this signal to within the negative or bias rating of the particular controlled rectifier.

Operation of this complete circuit is therefore within the design considerations in which the output transistor bank is rendered sharply conductive or nonconductive at selected On-Off ratio and selected frequency, during normal machining, permitting pulsing of the gap at this On-Off ratio and controlled machining results. For a constant value of resistance 157 and a constant supply voltage 102, machining current increases in direct proportion to the On-time at a particular frequency. In this manner, very exact control is achieved of actual machining current. This resistor is sometimes additionally switched to cause a different peak machining current thereby permitting even more accurate adjustment of machining conditions.

Per pulse cut-off circuitry responds instantaneously and through application of this novel keying network permits each pulse of machining power to be electronically inspected. Since satisfactory machining at the gap takes place above approximately 15 volts, the level of this keying reference may be set accordingly and any pulse having a gap voltage lower than 15 volts or the desired voltage, is instantaneously interrupted by the per pulse cut-off circuit. During times of this malfunction at the gap, a new Off-time prevails as determined by this improved cut-off circuitry thereby permitting complete recovery of the gap between pulses and yet not interrupting or cutting off pulses during desirable machining conditions. It is not uncommon in a train of many pulses to have perhaps two or three pulses pass satisfactorily; one pulse representing unsatisfactory conditions being interrupted permitting thereafter a series of additional satisfactory pulses, etc., a method of circuit operation vastly superior to those shown in the prior art. By proper selection of delay capacitor 163, the leading edge of each pulse is permitted to pass thereby achieving the effect of breaking minute stringers that tend to bridge the gap between the electrode and workpiece in a manner substantially better than that disclosed in the above mentioned Patent No. 2,951,969.

Consider next the operation of the transistorized EDM circuitry as shown, for example, in FIG. 2, employing both PNP and NPN transistors in an efficient circuit including switching chokes employed in the collector leads of successive stages for improved switching characteristics without the complex divider network as shown in FIG. 1. This is another circuit embodying transistors for the control of the pulsating gap power as well as in the preamplifier. It is essential to realize that in this instance, rectangular pulses are also generated in a manner very similar to the circuitry of FIG. 1.

In the transistor circuitry of FIG. 2, the working gap consisting of electrode 200 and workpiece 202 is connected through dropping resistor 208 to the collector of a transistor 206. The emitter of transistor 206 is connected to the positive terminal of the EDM D.C. power supply 204 through a balancing resistor 254. The negative terminal of power supply 204 is connected to the electrode through lead 260. Thus in a manner very similar to the circuitry of FIG. 1, transistor 206 in this instance, dropping resistor 208 and the working gap form a very similar direct connected loop across D.C. power supply 204. The pulser amplifier for output transistor bank 206 is similar in principle to the circuitry of FIG. 1 in that chokes are employed in the shunt drive loops.

Transistor 206 is generally a bank of many transistors, perhaps hundreds, capable of passing the very high output machining currents required in EDM. PNP transistor 214 may represent a bank of transistors for the preamplifier in a manner analogous to that of transistor 114 in the circuitry of FIG. 1. This circuitry is of opposite phasing from FIG. 1 since transistor driver bank 214 is nonconductive during conduction of transistor 206. PNP type transistor 206 is rendered conductive by D.C. transistor drive power supply 212 through resistor 226 and choke 224.

Conduction of transistor driver bank 214 connects the base of power bank 206 to positive D.C. bias 210 and thus cuts-off power bank 206 and shunts the current flow from resistor 226 and choke 224, such that the direction of electron flow in this instance is from drive voltage 212 through resistor 226, choke 224, collector-emitter of transistor 214 and back to the positive terminal of voltage 210 through limiting resistor 250.

Drive current during On-time of transistor 206 is furnished from D.C. supply 212 through resistor 226, choke 224, and the base-emitter circuit of transistor 206 back to the positive terminal of voltage 212. Choke 224, as well as choke 218 in the circuit of transistor 214 and choke 230 in the circuit of 222 are included to provide sharp leading edge drive of the appropriate transistor network.

During a period of conduction of transistor 214, increased flow is drawn through resistor 226 and choke 224 in accordance with the higher total voltage of bias 210 and drive voltage 212. As transistor 214 shuts off instantaneously, this increased electron flow is forced or accelerated through the base-emitter circuit of power transistor bank 206, thus providing sharp leading edge drive in an accelerated manner for the duration of the inductive effect of choke 224. As transistor 214 become instantaneously conductive, the increase in electron flow through choke 224 is momentarily retarded and provides for a sharp cut-off pulse to transistor 206, thus assuring vertical rise and fall and sharp switching action.

Similarly, NPN transistor 220 drives transistor 214 drawing electron flow from drive supply 212 through bias resistor 222, emitter-collector of transistor 220 and base-emitter circuit of transistor 214. Electron flow is momentarily retarded through choke 218 thus providing a sharp surge to transistor 214 for turn-On through the base-emitter circuit of transistor 214 and bias resistor 250. After the minute delay of choke 218, a shunt electron flow also occurs through choke 218 and resistor 216. As transistor 220 is switched Off sharply, choke 218 sustains electron flow in the same direction and sharply cuts-off transistor 214 causing cut-off electron flow through resistor 216, resistor 250 and clearing the emitter-base circuit of transistor 214.

NPN transistor 220 is likewise rendered conductive by the first drive transistor shown in this amplifier as transistor 234. Thus electron flow for drive of transistor 220 occurs from the negative terminal of supply 212 through limiting resistor 222, emitter-base circuit of transistor 220, collector-emitter of transistor 234, resistor 232, bias supply 210, to the positive terminal of the drive voltage 212. After a short delay determined by inductance 230, a shunt electron flow is also drawn through resistor 228 and inductance 230 in parallel with network 222, 220. As transistor 234 shuts off sharply, choke 230 sustains a cut-off electron flow through the base-emitter of transistor 220, resistor 222, resistor 228, thereby clearing and sharply cutting off transistor 220.

The essential difference between the circuitry of FIG. 1 and FIG. 2 is that the circuit of FIG. 2 contains transistors of correct polarity (PNP or NPN) for connection of the choke in the corresponding collector circuit rather than in the base (drive) circuit as shown in FIG. 1. This eliminates the complicated divider network 149, 155, 153, 154, of FIG. 1 and the precise interconnection of each drive loop required in the floating circuits represented by the cascaded stages as shown at 139, 145, 180 and the cumulative effect of the accelerating choke voltages.

The pulser drive shown in this instance as pulser 236 may be a tube type of pulser or multivibrator as shown in FIG. 1, or it may be a commercially available pulser of suitable characteristics, or it may be a transistor multivibrator designed for particular control of the circuitry. It is not necessary to describe pulser 236 in detail since it has been covered n FIG. 1 and would be equally suitable here.

In a manner somewhat similar to that of FIG. 1, transistor 233 operates as a per pulse cut-off device in the circuitry of FIG. 2. It must be noted in this instance, that when transistor 234 is rendered conductive, output transistor bank 206 is rendered nonconductive by virtue of the opposite phasing of the stages of amplification of this circuit with respect to the output transistor 206. This circuit has the additional advantage that failure of an amplifier transistor automatically biases the output bank Off. Because of their inherent construction requirements, transistors always fail shorted at least initially, and permanently if limited by external circuit resistance. Shorting into conduction of any drive transistor is amplified through successive stages thereby biasing transistor 206 Off.

Prior to the start of a machining pulse, pulser 236, transistors 234, 220, 214, are all conductive, biasing power transistor bank 206 Off. In this condition, NPN transistor 238 is also biased Off by the absence of any drive signal in its base circuit and by virtue of the direct resistance connection from the base of transistor 238 through potentiometer arm 240 and the lower leg of potentiometer 244, through the lower portion of potentiometer 246 to the emitter of transistor 238. Since no voltage exists in this loop, cut-off transistor 238 is nonconductive.

At the initiation of an arc machining power pulse, pulser 236 becomes sharply nonconductive, rendering transistors 234, 220, 214, nonconductive, thus permitting conduction of power transistor 206 by virtue of drive circuit 212, 226, 224. If the space between electrode 200 and workpiece 202 is sufficient to permit voltage across the working gap, this voltage is also presented across potentiometer 246 and a portion of this voltage is presented at tap 248. After a momentary delay interval determined by the relative magnitude of capacitor 242, the upper portion of potentiometer 244 and resistor 252, a keying signal occurs at potentiometer arm 240. The per pulse cut-off operation in this instance compares the relative magnitude between the portion of the gap voltage at 248 and the keying signal at 240. If the gap voltage is of sufficient magnitude to overcome the voltage at tap 240, transistor 238 is maintained in a nonconducting condition and thus does not affect the operation of the power circuitry. If the voltage at tap 248 is less than that of keying reference 240, transistor 238 becomes instantaneously conductive with drive electron flow in this instance occurring from the negative terminal of power voltage 204 through the lower portion of potentiometer 246, potentiometer arm 248, emitter-base of transistor 238, upper portion of potentiometer 244 and resistor 252, collector-emitter of transistor 206, balancing resistor 254, to the positive terminal of power voltage 204, thus rendering transistor 238 conductive. This condition of conduction corresponds exactly to the performance of the other circuits in which a voltage lower than the preset magnitude occurring across the gap will instantaneously render the cut-off device active. In this instance, conduction of transistor 238 drives transistor 234 into conduction and interrupts conduction of transistor 206 as explained above, thus instantaneously squelching the faulty pulse in the output.

In a manner similar to that of the previous circuit, transistor 238 may be so connected to directly affect the operation of the pulser by triggering the multivibrator portion of that pulser. In the circuitry shown in FIG. 2, however, cut-off transistor 238 overcomes the action of pulser 236 and operates independently of the pulser to shut off the faulty cutting power. Performance of the circuitry in this manner has the one essential difference that after the very short delay time encountered in the transistor components and the various stages of the amplifier and in delay capacitor 242, it is possible to fire the gap immediately without waiting for the normal interval between pulses caused by pulser 236. Of course, no pulse of duration longer that that determined by pulser 236 is permitted and the action of the cut-off transistor 238 in this instance is only to cut-off the faulty portion of any particular pulse. By proper connection of components, this same effect, if desired, could be achieved in either of the other circuits. It is only important in this instance to realize that all of the circuits perform instantaneously to interrupt a faulty condition of machining and do not rely on a delay of many pulses to turn On or Off positively.

This method of operation represents a substantial step forward in the art of EDM since now each individual arc pulse is electronically inspected and interrupted or shut off instantaneously if a flaw or undesirable condition of machining occurs even during an individual pulse. Furthermore, increased efficiency results since only faulty pulses or faulty portions of an individual pulse are cut-off and succeeding pulses which in many instances are entirely satisfactory are permitted the opportunity of machining.

FIG. 3 shows still another improved form of machining power circuit composed entirely of NPN transistors. It is well known in the semiconductor art that NPN transistors have inherently faster switching times, shorter rise and fall times and less saturation time than PNP transistors. It is known that this occurs because electrons may be mobilized far more rapidly than positive ion holes can be generated, and the amplifying carriers in NPN transistors are electrons due to the inherent characteristics of the device. For this reason, in a high speed-high power EDM circuit, the ultimate in switching speed at high power is achieved exclusively through use of NPN transistors and except for individual unit cost, this circuit is by far the most satisfactory, where switching times of the order of a microsecond or less are required in order to achieve high speed super finish machining.

The machining power transistor bank in FIG. 3 is shown as transistor 305 and operates in conjunction with D.C. machining power supply 302 to switch power to workpiece 300 and electrode 301. A power limiting resistor 327, and a balancing resistor 324, are connected as shown. In this circuit, the supply voltage is, of course, of oppositive polarity as is required with NPN transistors. The drive characteristics of FIG. 3 are somewhat similar to FIG. 2 in that the power bank 305 is switched normally On by conduction through drive voltage supply 303. Transistor 305 is rendered conductive by electron flow from the negative terminal of supply 303 through balancing resistor 324, the emitter-base circuit of transistor 305, choke 325, resistor 326.

As transistor 306 is rendered conductive, bias supply 304 is applied directly to the base of output transistor bank 305. Electron flow is momentarily retarded by choke 325 and a sharp turn-off electron flow occurs from bias supply 304, balancing resistor 319, emitter-collector of transistor 306, base-emitter of transistor 305, balancing resistor 324 to the positive terminal of bias 304 thereby sharply rendering transistor 305 nonconductive. After the delay interval of choke 325 an additional electron flow occurs around the loop 304, 319, 306, 325, 326, 303, because of the higher total voltage of this series connection of drive supply 303 and bias supply 304. This increased current flow continues through choke 325 and resistor 326 until transistor 306 becomes sharply nonconductive. At that time, choke 325 induces a voltage in such a manner to sharply accelerate turn-On of transistor 305 and is blocked from the circuitry of transistor 306 since it is connected in the collector lead of transistor 306 rather than the common emitter relationship as in FIG. 1.

Transistor 306 is rendered sharply nonconducting by conduction of transistor 307. During the period of conduction of transistor 306, its drive electron flow occurs from the negative terminal of bias supply 304 through balancing resistor 319, emitter-base of transistor 306, bias capacitor 321 and reference diode 320, choke 322, resistor 323 to the positive terminal of drive supply 303. Transistor 307 is rendered sharply conductive thereby connecting bias supply 321 sharply from base to emitter of transistor 306 and a sharp turn-Off electron flow occurs from bias supply 321 through the base-emitter circuit, resistor 319, resistor 317 through the emitter-collector circuit of transistor 307. An additional shunt electron flow occurs from the negative terminal of bias 304, balancing resistor 317, emitter-collector of transistor 307, choke 322, resistor 323 and drive supply 303. At this time, increased current flow ocurs through choke 322 and resistor 323 since there is no additional voltage drop at this time through bias capacitor 321 and reference diode 320.

As transistor 307 is rendered sharply nonconductive, this increased electron flow accelerates turn-On of transistor 306 as is characteristic of these choke accelerating circuits.

Similarly, turn-On of transistor 307 occurs from the negative terminal of bias supply 304 through balancing resistor 317, emitter-base circuit of transistor 307 through double anode reference diode 316, bias capacitor 314, reference diode 315, choke 311, resistor 312, drive supply 303.

An additional novel circuit is incorporated in conjunction with transistor 307 and is the double anode reference diode 316 and diode 318. In this amplifier circuit, transistors 308 and 306 are rendered conductive in phase to turn-Off or sharply switch Off transistor bank 305. Transistor 307 conducts in phase with transistor 305. As mentioned earlier, it is extremely important that a very narrow On-time be possible in advanced machining circuits and for this reason, it is extremely important that transistors be sharply switched Off and less important that they be sharply switched On. Therefore, the important stages of amplification switch succeeding stages Off rather than On thereby eliminating turn-Off delay due to storage time and turn-Off time. This assures an extremely narrow On-time during conditions of drive calling for an extremely narrow output pulse. Transistor 307 is therefore phased reversely, in other words, it turns-Off to turn-On machining power transistor bank 305. For this reason, diode 318 and double anode diode 316 are incorporated to insure that transistor 307 operates in its non-saturated region thereby eliminating the storage time caused by saturating drive. Any tendency to overdrive transistor 307 in its turn-On circuit through choke 311, resistor 312 causes the voltage from emitter to collector to fall sharply. As the total voltage from emitter to collector and the series drop required by diode 318 falls below that of double anode reference diode 316, electron flow occurs from the minus terminal of supply 304 through balancing resistor 317, emitter-collector of transistor 307, diode 318, bias supply 314, choke 311, resistor 312, thereby shunting a portion of the drive current of transistor 307. With proper selection of the drop across double anode diode 316, this assures non-saturating drive of transistor 307 which in turn eliminates undesirable storage time assuring fast switching characteristics of this transistor.

As in the other stages, transistor 307 is sharply biased non conducting by conduction of transistor 308 causing electron flow from the minus terminal of bias capacitor 314 through double anode diode 316, base-emitter circuit of transistor 307, balancing resistor 317, resistor 313, emitter-collector of transistor 308 to the positive terminal of bias capacitor 314, thereby sharply biasing transistor 307 nonconducting. At this time, choke 322 kicks to block diode 318 sharply blocking this diode and preventing loss of turn-Off current from this shunt circuit.

Turn-On of transistor 307 is accelerated in an identical manner to the previous stages by the increased electron flow through choke 311 and resistor 312 caused by the interruption of this increased conduction through transistor 308.

As in the case of FIG. 2, pulser 310 conducts to render transistor 308 and transistor 306 conductive to sharply interrupt conduction of power transistor 305. Similarly, during conduction of the power transistor 305, pulser 310 is nonconductive and short circuit cut-Off transistor 309 intervenes similarly in the event of short circuit or abnormally low gap voltage to cause conduction of transistor 308 similarly sharply biasing transistor 305 nonconducting. In this circuit, cut-Off transistor 309 operates quite similarly to NPN transistor 238 of FIG. 2, except that the direction of electron flow is of course reversed for this PNP device.

A keying voltage is developed negative to positive from keying reference potentiometer arm 330 to workpiece 300 by conduction of power transistor bank 305. As in the circuitry of FIG. 2, this keying signal is delayed by resistor 328, capacitor 331. Potentiometer 332 is connected directly across the gap and a portion of gap voltage is present at tap reference arm 333. If the reference set by 330 is more negative or of higher value than that of 333 corresponding to a low voltage across the machining gap, transistor 309 is rendered sharply conductive. During this failure condition, drive electron flow for transistor 309 occurs from supply 302, balancing resistor 324, emitter-collector of transistor 305, resistor 328, potentiometer 329, base-emitter of transistor 309 through the lower portion of potentiometer 332. Amplified output electron flow occurs from bias supply 304, resistor 313, emitter-base of transistor 308, collector-emitter of transistor 309 through the lower portion of potentiometer 332 thereby triggering transistor 308 into conduction and sharply interrupting conduction of the output transistor bank 305.

If the portion of gap voltage as determined by potentiometer arm 333 is higher than the keying reference, transistor 309 is of course biased nonconducting and machining proceeds in accordance with the selected On-time and frequency of pulser 310.

From the above disclosure it can be seen that the common characteristic of all of these sharp pulse drive circuits is the operation of the accelerating choke in conjunction with the drive lead capacitor in each circuit. FIG. 1 employs a novel cascaded circuit for developing bias for several stages of a transistor amplifier from a common bias supply and for isolating the individual choke kicks by the cascaded emitter connections as shown. FIG. 2 shows a simplified form of drive circuit employing alternate stages of PNP and NPN circuitry. The principles employed in the circuit of FIG. 2 would apply equally well if the majority of transistors were NPN. By proper reversal of supply voltages in accordance with the disclosure of FIG. 3, power transistor 206, drive transistors 214 and 234 could all be NPN employing a single PNP transistor at 220 and a PNP short circuit protection transistor at 238. It is believed that this modification is obvious from the foregoing discussion and the disclosure of FIGS. 2 and 3.

With transistors presently available, the improved circuit of FIG. 3 employing the double anode reference diode and the separate reference diodes 315 and 320 for developing bias for each individual stage is superior in operation to the two previously described circuits. Even for narrow On-time, drive current particularly for NPN transistors greatly exceeds turn-Off or bias current and this can be developed readily on storage capacitors 321 and 314 as an extremely simple and direct means of obtaining a floating bias in each circuit without the expense and problems introduced by separate D.C. supplies at each of these points.

In the above examples, the electrode is shown as connected to the negative output of the machining power supply and the workpiece to the positive output. Present day knowledge indicates that in certain specialized and improved forms of machining that polarity may be reversed. It is essential in each case that discrete pulses of the same polarity be applied in each case and that polarity be selected in accordance with known principles. The above examples apply equally well to either polarity of machining.

It will thus be seen that I have shown and described a new and improved electrical discharge machining power circuit and preferred examples of apparatus constructed in accordance with this invention. By so doing, it is not intended to limit the invention to the disclosure but only as set forth in the following claims.

I claim:

1. In an electrical discharge machining apparatus for machining a conductive workpiece by means of short-duration, discrete, erosive, electrical discharges between an electrode and the workpiece across a dielectric fluid filled gap, a source of unidirectional voltage, a transistor device connected in series with said source and said gap, pulser device operably associated with said transistor means operable to render said transistor means alternately, sharply, conductive for selected periods and nonconductive for selected periods, at selected frequency, and means operatively connected to the control electrode of said transistor device for accelerating turn-On of said transistor device including means for providing drive current substantially in excess of normal during the initial portions of the conductive periods of said transistor device.

2. The combination set forth in claim 1, wherein said drive current increasing means comprises a choke connected in the base-emitter circuit of said transistor device.

3. The combination set forth in claim 2, including a network connected in the base circuit of said transistor device comprising, a lead capacitor and a resistor shunted across said capacitor.

4. In an electrical discharge machining apparatus for machining a conductive workpiece by means of short-duration, discrete, erosive, electrical discharges between an electrode and the workpiece across a dielectric fluid filled gap, a source of unidirectional voltage, a transistor device connected in series with said source and said gap in common emitter relationship, pulser means operably associated with said transistor device operable to render said transistor device alternately, sharply, conductive for selected periods and nonconductive for selected periods at selected frequency, and means for accelerating turn-On and turn-Off of said transistor device including a choke connected in the base-emitter circuit of said transistor device for providing drive current and voltage substantially in excess of normal during the initial portions of the conductive periods of said transistor device.

5. The combination set forth in claim 4 including a lead capacitor shunted with resistance connected in the base circuit of said transistor.

6. The combination set forth in claim 5 in which said choke is connected in parallel with said base and emitter and a controlled amount of current is bypassed through said choke after a delayed interval of each conduction period for accelerating turn-Off of said transistor device by a turn-Off current caused by the induced voltage of said choke during the period of turn-Off.

7. The combination set forth in claim 5 including, a drive voltage source connected in series with said choke for rendering said transistor device conductive, a bias voltage source, and a transistor connected between said bias voltage source and the base-emitter of said transistor device operable upon conduction thereof to bias said transistor device sharply nonconductive.

8. In an electrical discharge machining appartus for machining a conductive workpiece by means of short-duration, discrete, erosive, electrical discharges between an electrode and the workpiece across a dielectric fluid filled gap, a source of unidirectional voltage, a transistor device connected in series with said source and said gap, pulser means operably associated with said transistor means operable to render said transistor device alternately, sharply, conductive for selected periods and non-conductive for selected periods at selected frequency, and means for accelerating turn-On and turn-Off of said transistor device including a transistorized amplifier connected between said pulser and said device and a choke connected in the output circuit of said amplifier for providing drive current substantially in excess of normal during the initial portions of the conductive periods of said transistor device.

9. The combination set forth in claim 8 wherein said choke is connected in series with a resistor and this series network is connected in parallel in the base-emitter circuit of said transistor device whereby a controlled amount of current is shunted through said choke during each conduction period of said device for causing an increase in drive current during initial portion of said conduction period and accelerated turn-Off at the end of said period.

10. The combination set forth in claim 9, including a resistance connected in said base-emitter circuit and a capacitor in shunt therewith for additionally accelerating turn-On and turn-Off current flow from said amplifier.

11. The combination set forth in claim 8, including a second source of voltage of like polarity with said first source, and means for connecting said choke in series with said second source and a resistor, to the base-emitter circuit of said transistor device for rendering said transistor conductive and means connecting a transistor of said amplifier in series with a bias supply of opposite polarity and the base-emitter circuit of said transistor device for sharply biasing said transistor device nonconductive.

12. The combination set forth in claim 8 in which said transistor device and said amplifier are composed of NPN transistors and are alternately phased in each successive stage.

13. The combination set forth in claim 12 in which said transistor device is biased nonconducting by conduction of the last stage of said amplifier.

14. In an electrical discharge machining apparatus for machining a conductive workpiece by means of short-duration, discrete, erosive, electrical discharges between an electrode and the workpiece across a dielectric fluid filled gap, a source of unidirectional voltage, at least one NPN power transistor connected in series with said source and said gap, pulser means operably associated with said power transistor operable to render said power transistor alternately, sharply, conductive for selected periods and nonconductive for selected periods at selected frequency, and a multiple stage amplifier comprised of NPN transistors with successive stages alternately conducting and nonconducting in phase with said power transistor, in which said stages conducting in phase with said power transistor include drive limiting means to maintain drive to said stages below saturation.

15. The combination set forth in claim 14 in which said drive limiting means includes a double anode reference diode connected to the base of the NPN transistor of said stage for conducting drive current and a diode having its cathode connected to the collector of said transistor of said stage and its anode connected to the anode of the double anode reference diode remote from said base.

16. The combination set forth in claim 15 including a choke connected in each stage for additionally accelerating turn-On and turn-Off of said stages.

17. The combination set forth in claim 16 including a reference diode and storage capacitor connected in the base circuit of each of said stages.

18. The combination as set forth in claim 1 in which said last mentioned means is connected across the control electrode and one principal electrode of said transistor device.

19. The combination as set forth in claim 1 in which said transistor device is connected in series with said source and said gap in common emitter relationship.

20. The combination as set forth in claim 1 in which said accelerating means includes a network comprising a resistance for limiting base drive current and a capacitor connected in parallel therewith.

References Cited in the file of this patent

UNITED STATES PATENTS

| | | |
|---|---|---|
| 2,951,969 | Matulaitis et al. | Sept. 6, 1960 |
| 3,020,448 | Fefer | Feb. 6, 1962 |

UNITED STATES PATENT OFFICE
CERTIFICATE OF CORRECTION

Patent No. 3,120,619

February 4, 1964

Robert S. Webb

It is hereby certified that error appears in the above numbered patent requiring correction and that the said Letters Patent should read as corrected below.

Column 11, line 57, for "that", first occurrence, read -- than --; column 14, line 71, after "gap," insert -- a --; line 73, for "means", both occurrences, read -- device --; column 15, lines 1 and 2, strike out "operatively connected to the control electrode of said transistor device" and insert the same after "means" in line 3, same column 15.

Signed and sealed this 14th day of July 1964.

(SEAL)

Attest:

ESTON G. JOHNSON
Attesting Officer

EDWARD J. BRENNER
Commissioner of Patents